United States Patent [19]
Logan

[11] Patent Number: 5,666,113
[45] Date of Patent: Sep. 9, 1997

[54] SYSTEM FOR USING A TOUCHPAD INPUT DEVICE FOR CURSOR CONTROL AND KEYBOARD EMULATION

[75] Inventor: James D. Logan, Windham, N.H.

[73] Assignee: MicroTouch Systems, Inc., Methuen, Mass.

[21] Appl. No.: 525,859

[22] Filed: Sep. 5, 1995

Related U.S. Application Data

[63] Continuation of Ser. No. 23,872, Feb. 26, 1993, abandoned, which is a continuation of Ser. No. 739,136, Jul. 31, 1991, abandoned.

[51] Int. Cl.$^6$ ........................................ G09G 3/02
[52] U.S. Cl. .................. 341/34; 345/157; 345/160; 345/168; 345/173; 341/22
[58] Field of Search ........................ 341/20, 22, 34; 345/157, 160, 168, 173

[56] References Cited

U.S. PATENT DOCUMENTS

| | | | |
|---|---|---|---|
| 4,028,695 | 6/1977 | Saich | 341/23 |
| 4,302,011 | 11/1981 | Pepper, Jr. | 341/20 |
| 4,680,577 | 7/1987 | Straayer et al. | 340/206 X |
| 5,428,367 | 6/1995 | Mikan | 345/157 |

FOREIGN PATENT DOCUMENTS 3419422  11/1985  Germany ........................ 340/709

*Primary Examiner*—Jeffery Hofsass
*Assistant Examiner*—Albert K. Wong
*Attorney, Agent, or Firm*—Iandiorio & Teska

[57] ABSTRACT

A system for using a touch-sensitive computer input touchpad for computer cursor control and keypad emulation in which the system senses a touch on the touchpad surface, resolves lateral touch movement after the touch, and establishes cursor control on resolution of sufficient lateral movement.

2 Claims, 2 Drawing Sheets

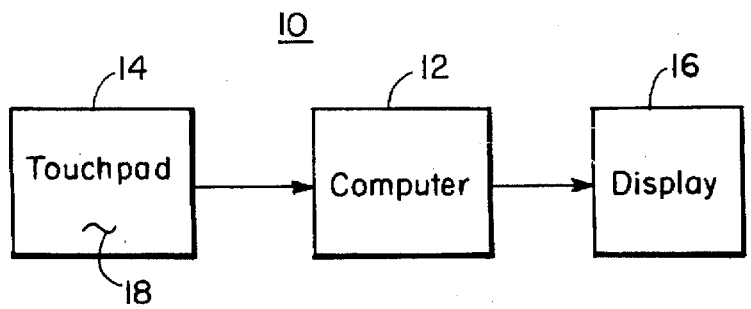
FIG. 1
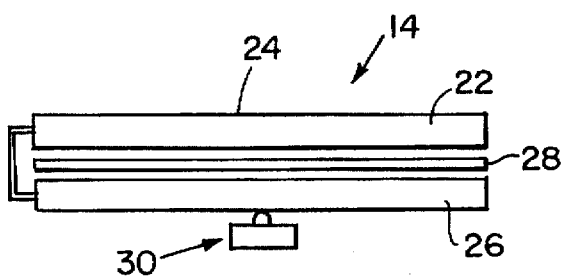
FIG. 2A
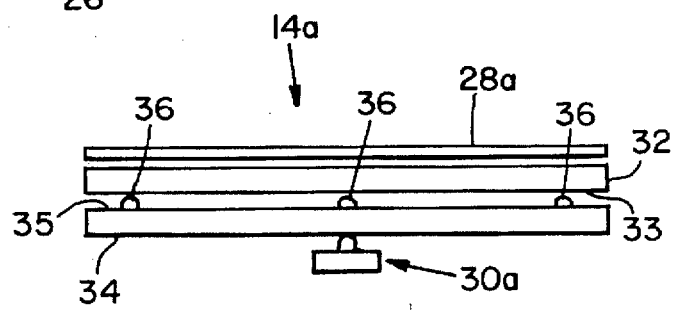
FIG. 2B
FIG. 2C

SYSTEM FOR USING A TOUCHPAD INPUT DEVICE FOR CURSOR CONTROL AND KEYBOARD EMULATION

This is a continuation of application Ser. No. 08/023,872 filed Feb. 26, 1993 which is a continuation of application Ser. No. 07/739,136, filed Jul. 31, 1993 both abandoned.

FIELD OF INVENTION

This invention relates to a system for using a touch-sensitive computer input touchpad for both cursor control and as a keypad emulation device.

BACKGROUND OF INVENTION

Touchpad input devices are small, touch-sensitive devices that can be used as a pointing device to replace a mouse, trackball or other cursor locator/input device in mouse-driven or other personal computers. The touchpad typically includes a small touch-sensitive screen up to 3" by 5" in size. The touchpad produces X, Y location coordinates representative of the location of the touching device (finger or inanimate object such as stylus) on its surface. The computer interprets these X,Y coordinates to locate the cursor on the computer display. The user typically controls the computer cursor location by moving the input device across the sensor surface. These touchpad devices typically include a switch or "button" underneath the pad or to the side which, when pressed, is used to emulate the selection function of the button on a mouse. In cases where the touchpad has no selection button, a tap on the sensor made immediately after completion of the cursor motion and in a location relatively close to where the cursor location movement was completed, would be interpreted as a selection action equivalent to a button click.

Most personal computer systems employing touchpads as mouse replacements also have a standard keyboard as another means of computer input. In some instances, the touchpads can be used as at least a partial replacement or supplement for the keyboard by designating areas of the touchpad to correspond to the equivalent of keystrokes or keystroke sequences. A template which fits on the surface of the touch sensitive surface of the touchpad, or beneath it if it is transparent, can be used to remind the user of the function of each area. The operator can switch the touchpad from the typical touchpad use (mouse cursor control and mouse emulation) to keyboard emulation through means of keyboard input, a menu selection on the screen, or by clicking a button on the touchpad. The user would then be able to enter a particular keystroke by touching the touchpad in the area corresponding to that keystroke and clicking the button beneath the touchpad, or tapping the sensor if there were no button. For example, if the touchpad is being used as a means of entering numbers into the computer, the template may have small areas designated with numbers and mathematical symbols. When the touchpad is in keypad mode, the system is preprogrammed to recognize a touch at the locations corresponding to those designated areas as an input of that number or operation. For example, if the operator touched the number nine on the template while clicking the touchpad switch, the computer would determine that the operator designated for entry the number nine and so would enter a nine into the system.

The advantage of using the touchpad as both a cursor-control device and a keypad is that the user can do both activities at one location and not have to move back and forth between the keyboard and touchpad. Also, if the touchpad were part of a total system design, the need to build function keys into the keyboard could be eliminated.

Although this allows the user to employ the touchpad as both a mouse emulator and a keypad, the operator must continuously manipulate the touchpad or the keyboard to command the touchpad to enter into either the mouse-emulation mode or the keypad mode; if the operator needs to switch between the use of the touchpad as a mouse emulator and a keypad, a separate step must be taken each time a change of mode is desired. As most software would require a mixed sequence of keypad entries and cursor control actions, the need to change modes makes this bi-modal use cumbersome. Accordingly, users often find it easier to simply use the standard computer keyboard for entry of letters and numbers rather than use the touchpad as both a mouse emulator and a keypad.

SUMMARY OF INVENTION

It is therefore an object of this invention to provide a system which facilitates the use of a touchpad as both a mouse emulator and a keypad.

It is a further object of this invention to provide such a system which allows the user to easily switch between mouse emulation and keypad use.

This invention results from the realization that the use of touchpads as both mouse and keypad emulators is greatly facilitated by having the touchpad automatically change modes through the use of software which interprets the initial motion made by the user immediately after contact to ascertain whether the user wishes the touchpad to be in mouse emulation or keypad mode. This software either establishes the touchpad in cursor control mode if it senses the finger moving laterally after touchdown on the touchpad sensor surface, or puts the touchpad into keypad emulation mode if the user pushes down directly on the selection button before any lateral movement takes place while simultaneously executing the keypad command associated with that touch location. In those touchpads where there is no button beneath the sensor, the software will interpret a tap on the screen in the same manner as a button click.

This invention features a system for using a touch-sensitive computer input touchpad, which preferably includes a separate switch beneath the touchpad, for both computer cursor control and keypad emulation control. The system senses a touch on the touchpad surface and resolves any lateral touch movement after the touch. If a minimum amount of lateral movement is sensed, the system establishes the touchpad to be in cursor control mode and simultaneously translates all such lateral movements into the appropriate cursor movements. If the switch or button is clicked (or if a tap [as identified above] is detected in those systems with no button or switch) before any such lateral movement takes place, within a short preestablished time period after touchdown, the system enters the keypad emulation control mode. The keystroke or keystroke sequence associated with the area touched will then be executed by the system. After entry of the keypad emulation control mode, the system may remain in this mode for a predetermined time, or may remain in the mode until sufficient lateral movement of the touch device is accomplished as described above.

DISCLOSURE OF PREFERRED EMBODIMENT

Other objects, features and advantages will occur to one skilled in the art from the following description of a preferred embodiment and the accompanying drawings, in which:

FIG. 1 is a block diagram of the system of this invention;

FIG. 2A is a side elevational view of a capacitive sensor embodiment of the touchpad of FIG. 1;

FIG. 2B is a side elevational view of a resistive sensor embodiment of the touchpad of FIG. 1;

FIG. 2C is a plan view of a template useful in the touchpad of FIG. 2A; and

Figure 3:
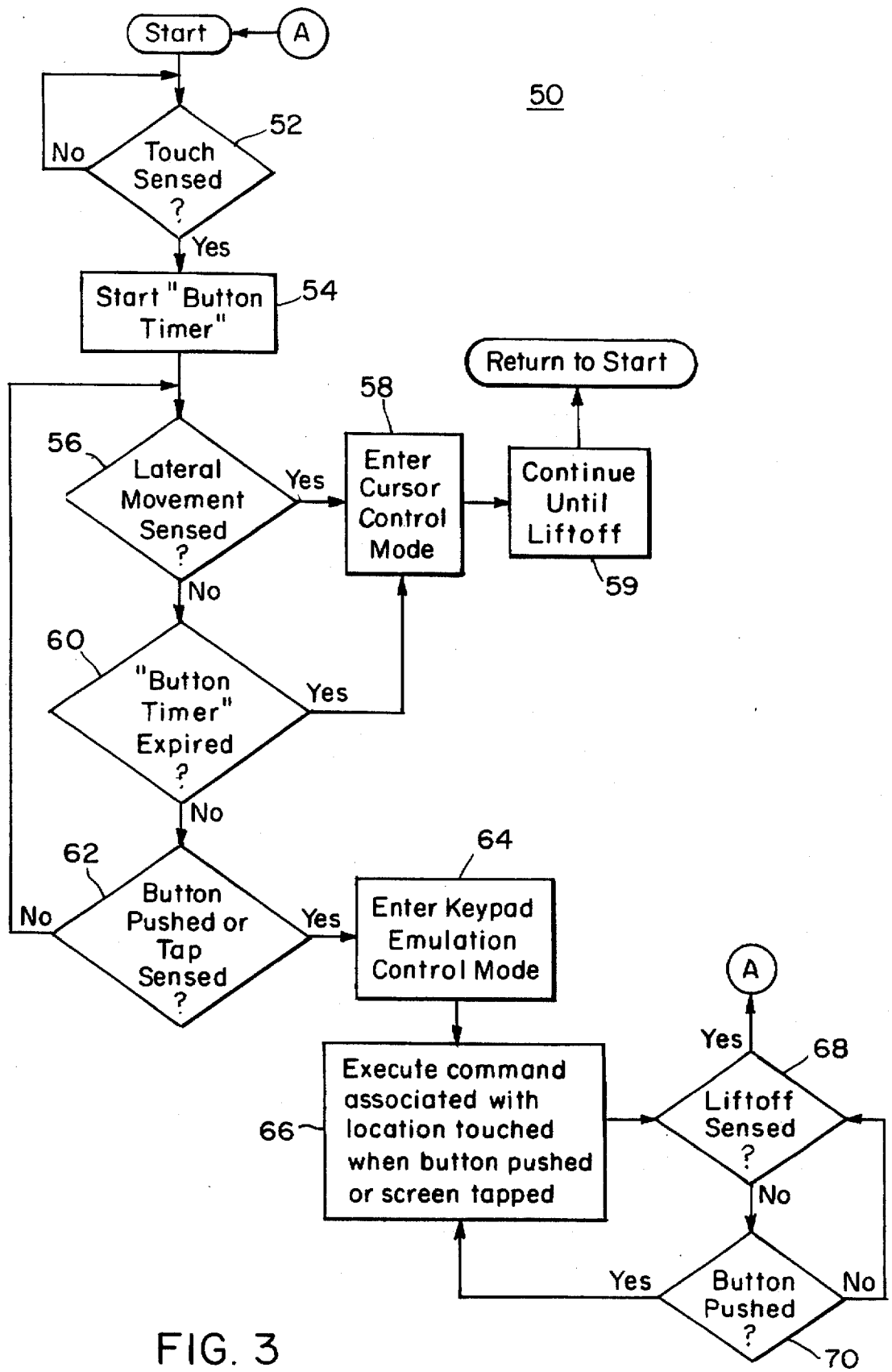
FIG. 3 is a flowchart for the system of this invention that allows the touchpad to be used as both a mouse and keypad emulator.

This invention may be accomplished in a system for using a touch-sensitive computer input touchpad for both computer cursor control and keypad control in which the system senses the touch of a finger or another object on the touchpad surface and by resolving any lateral touch movement after the touch determines if that user wishes the touch action to be used for cursor control or for the selection of a keypad function. Cursor control is deemed to be the intent if sufficient lateral movement is detected, preferably about 1/16", while keypad control is established in one embodiment by operation of a separate mechanical switch under the touchpad before such lateral movement takes place, or in a second embodiment by sensing a touch lift-off from the touchpad before any minimum lateral motion takes place, both preferably within a short pre-established time period after touchdown.

There is shown in FIG. 1 computer system 10 including the system of this invention. System 10 employs standard computer 12 and display 16, which may be, for example, an Apple Macintosh SE Personal Computer. Touchpad input device 14 having touch-sensitive surface 18 is employed as an input device for computer 12. Touchpad 14 may employ any of the touch-sensing technologies known to those skilled in the art, for example, capacitive sensing, or resistive membrane sensing. Touchpad 14 is typically operated with a passive conductive stylus, a corded active stylus, or a human finger.

As shown in FIG. 2A, capacitive touchpad 14 includes conductive coating 24 (the touch surface) on transparent glass substrate 22. Keypad template 28 is inserted under substrate 22 and above non-active template holder 26 so that template 28 is visible through the sensor. Mechanical switch 30 is a second means of computer input, similar to the mechanical switch on a mouse. For resistive touch-sensing technology, FIG. 2B, touchpad 14a includes plastic membranes 32 and 34 having conductive surfaces 33 and 35, respectively, separated by insulating spacers 36. Template 28a is placed on the surface of the sensor. Mechanical switch 30a is provided as a second means of computer input.

An example of a template which may be used to allow touchpad 14 to be used like a calculator keypad is shown in FIG. 2C. When such a template is placed under or over the surface of touchpad 14 as appropriate, system 10 is enabled to recognize a touch in each designated template area as a command to input the appropriate number or accomplish the appropriate mathematical function, as would be apparent to those skilled in the art.

Flowchart 50, FIG. 3, illustrates the system of this invention which uses the touchpad and computer system as described above. If a touch is sensed on the touchpad surface, step 52, the system preferably starts a "button timer", which is a preestablished time within which the operator must press the mouse emulation button 30, FIG. 2A, or liftoff from the surface if no button is present, in order for the system to recognize the button push or tap. Meanwhile, the system in step 56 is looking for lateral movement of the touch device on the touch screen. In one embodiment, lateral movement may be defined as movement in any direction greater than a preestablished distance, for example 1/16", so that the operator does not have to keep the finger or stylus absolutely still on the screen while accomplishing the button click or screen tap. If lateral movement of at least the predetermined distance is sensed, the system enters the cursor control mode in which the input device movement across the sensor surface causes cursor movement. Such cursor control is enabled until the stylus is lifted from the screen, step 59, at which time operation may return to the start. Alternatively, system 50 could interpret a screen tap or touch within a predetermined short time after liftoff, at approximately the same location where the liftoff occurred, as a click or push of button 30, which then accomplishes a function at the original liftoff cursor location, such as icon selection or menu pulldown, as is typically accomplished in a mouse driven system by the operator pushing the mouse button.

If the system does not sense the sufficient lateral movement after touchdown, step 56, the system proceeds to step 60. If the button timer has expired, the system enters cursor control mode, step 58. If the button timer has not expired, the system monitors for either operation of button 30 or a screen tap, step 62. If the button is pushed or the screen is tapped within the button timer period, the system enters the keypad emulation control mode, step 64, and executes the command associated with that touch location, step 66. If the button has not been pushed, or the screen has not been tapped, operation returns to step 56 in which lateral movement is monitored.

Accordingly, if the operator within the "button timer" period after touchdown pushes down or taps on device 14, the system interprets the operation of switch 30 or the tap as a stroke of the keypad. The system of this invention thus allows a touchpad to be used in both the traditional manner (for cursor movement) and as a keypad, without the need for the operator to choose one of the two modes through some selection means.

Alternatively, when there is a click button an algorithm can be devised allowing the user to stay in keypad mode (once entered) as long as contact with the touch surface is maintained. In other words, the user could slide around on the glass pressing different keypad buttons, as accomplished with steps 68 and 70, once in keypad mode.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A system which automatically switches use of a touch-sensitive computer input touchpad between the functions of cursor control and keypad emulation, the system comprising:

touchpad means;

means for sensing a touch on the touchpad means;

means for timing the time period between a touch on and a lift off from said touchpad means;

mean for sensing lateral movement across the touchpad means after a touch and for determining the distance of said lateral movement;

means for entering cursor control upon a lateral movement across the touchpad means, after a touch, of more than a predetermined distance and for entering cursor control upon the expiration of a predetermined time period after a touch without a liftoff; and means for entering keypad emulation upon the sensing of a liftoff and a subsequent touch on the touchpad means within said preestablished time of and within said predetermined distance from a prior touch on said touchpad.

2. The system of claim 1 further including separate switch means and means for entering keypad emulation upon sensing movement of said switch means within said preestablished time period of and within said predetermined distance from a prior touch on said touchpad means.

* * * * *